May 10, 1960

A. J. DI CARA 2,935,929

APPARATUS FOR OPENING CLOSED CONTAINERS
AND EXTRACTING CONTENTS THEREOF

Filed June 24, 1958

INVENTOR.
Alphonse J. Di Cara

BY
Adams, Forward and McLean
ATTORNEYS

May 10, 1960

A. J. DI CARA 2,935,929

APPARATUS FOR OPENING CLOSED CONTAINERS
AND EXTRACTING CONTENTS THEREOF

Filed June 24, 1958

INVENTOR.
Alphonse J. DiCara

BY
Adams, Forward and McLean
ATTORNEYS

May 10, 1960 A. J. DI CARA 2,935,929
APPARATUS FOR OPENING CLOSED CONTAINERS
AND EXTRACTING CONTENTS THEREOF
Filed June 24, 1958 4 Sheets-Sheet 3
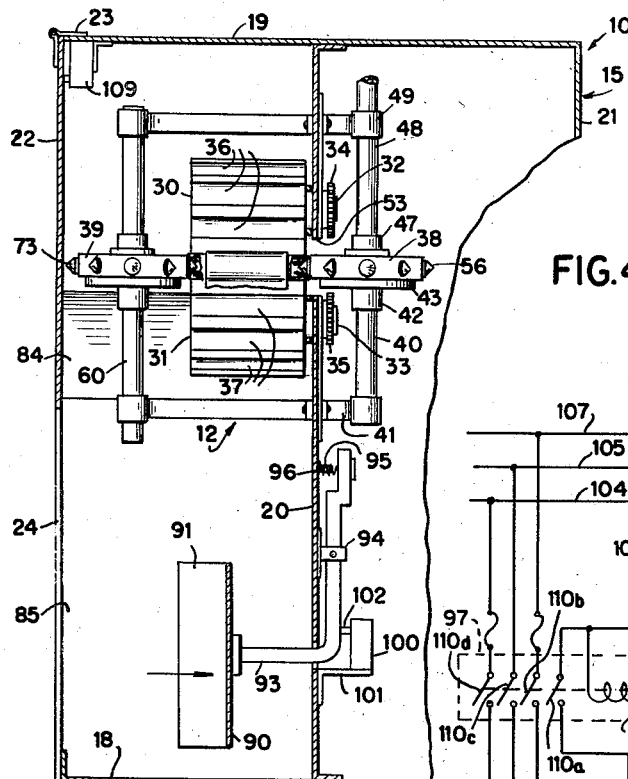
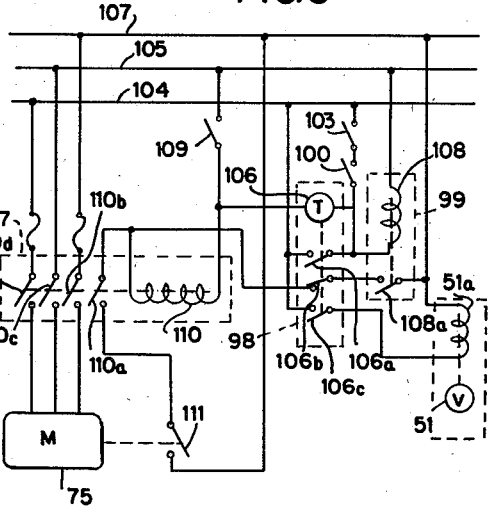
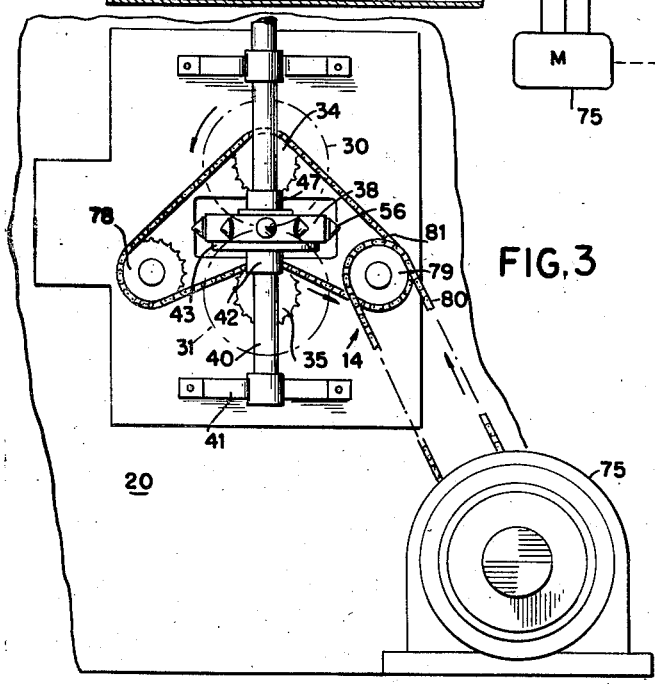
INVENTOR.
Alphonse J. Di Cara
BY
Adams, Forward and McLean
ATTORNEYS

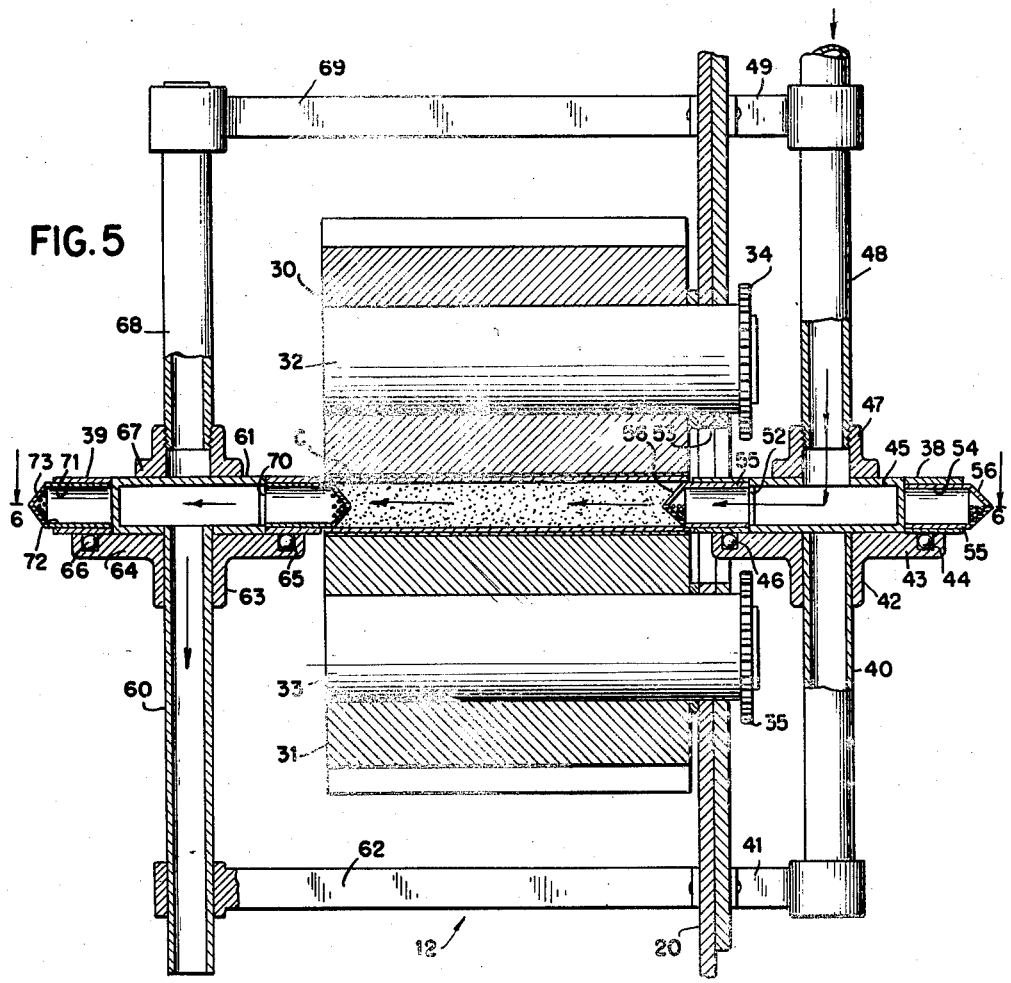
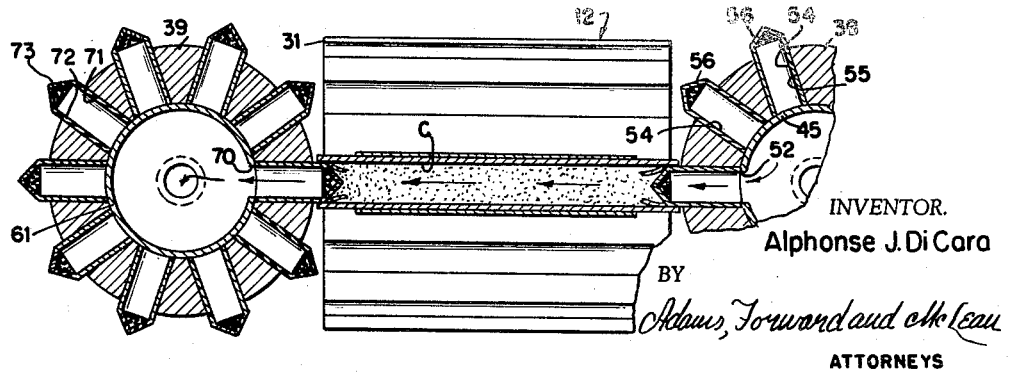

United States Patent Office 2,935,929
Patented May 10, 1960

2,935,929

APPARATUS FOR OPENING CLOSED CONTAINERS AND EXTRACTING CONTENTS THEREOF

Alphonse Joseph Di Cara, Whitestone, N.Y., assignor to Simon Adler, Brooklyn, N.Y.

Application June 24, 1958, Serial No. 744,094

8 Claims. (Cl. 99—289)

My invention relates to the preparation of solutions and suspensions in liquid media and in particular, provides a device for contacting the contents of a closed container with a liquid in a manner removing such contents or extracting a portion of such contents in the liquid. In a more specific sense, my invention is adapted to select a cartridge or similar container, open the ends of such container and pass a liquid through the container. As such, the device of my invention is particularly useful in the preparation of beverages such as coffee, tea and the like, and has particular advantage in the repeated preparation of individual servings.

As is well known freshly brewed coffee from the standpoint of taste is far superior to coffee which has been kept heated for a period of time or which has been reheated. In restaurants and similar commercial establishments, however, the general practice is to brew a large quantity of coffee which is kept heated for a period of time, since the repeated brewing of small portions to meet continuous demand generally experienced by such establishments is an uneconomic operation. As a consequence, it is difficult in such establishments to purchase a freshly brewed cup of coffee, and one is ordinarily obliged to accept a less-than-satisfactory beverage which has lost its fresh flavor.

It is a particular object of my invention to provide a coffee brewing machine capable of semi-automatic operation to brew individual servings of coffee as these are required. It is a further object of my invention to provide such a machine which can be operated for a long period of time with a minimum requirement of labor for refilling and the like. It will be also evident, upon further description of the machine of my invention, that it is similarly useful for brewing individual servings of tea and for preparing milk, cocoa and hot chocolate from the conventional powdered forms of these materials. The machine of my invention is also useful in preparing soup from condensed form and can even be employed in the preparation of soft drinks from syrups by employing carbonated water as the liquid.

These and other objects of my invention are essentially achieved employing a device having a pair of cooperating rotating members which are adapted to select a cartridge or other similar container and hold it in a fixed position while simultaneously piercing the ends of the cartridge with a second pair of cooperating rotating members, one of which is connected to a source of hot water or other liquid and the other of which is connected to a dispensing device. Suitably these four cooperating devices are provided with a supply of individual containers of the coffee or other material to be dissolved or extracted, such that the containers can be fed when desired one at a time between the cooperating members.

For a more complete understanding of the practical application of the principles of my invention, reference is made to the appended drawings in which:

Figure 3 is a fragmentary rear elevation of the device shown in Figure 1 with the rear cover panel removed;

Figure 4 is a vertical section taken at line 4—4 in Figure 2;

Figure 5 is an enlarged, fragmentary sectional view similar to Figure 4 illustrating the basic cooperating members employed to carry out the principles of my invention;

Figure 6 is a cross-section taken at line 6—6 in Figure 5;

Figure 8 is a schematic diagram of a control circuit for the machine shown in the drawings.

Figure 1:
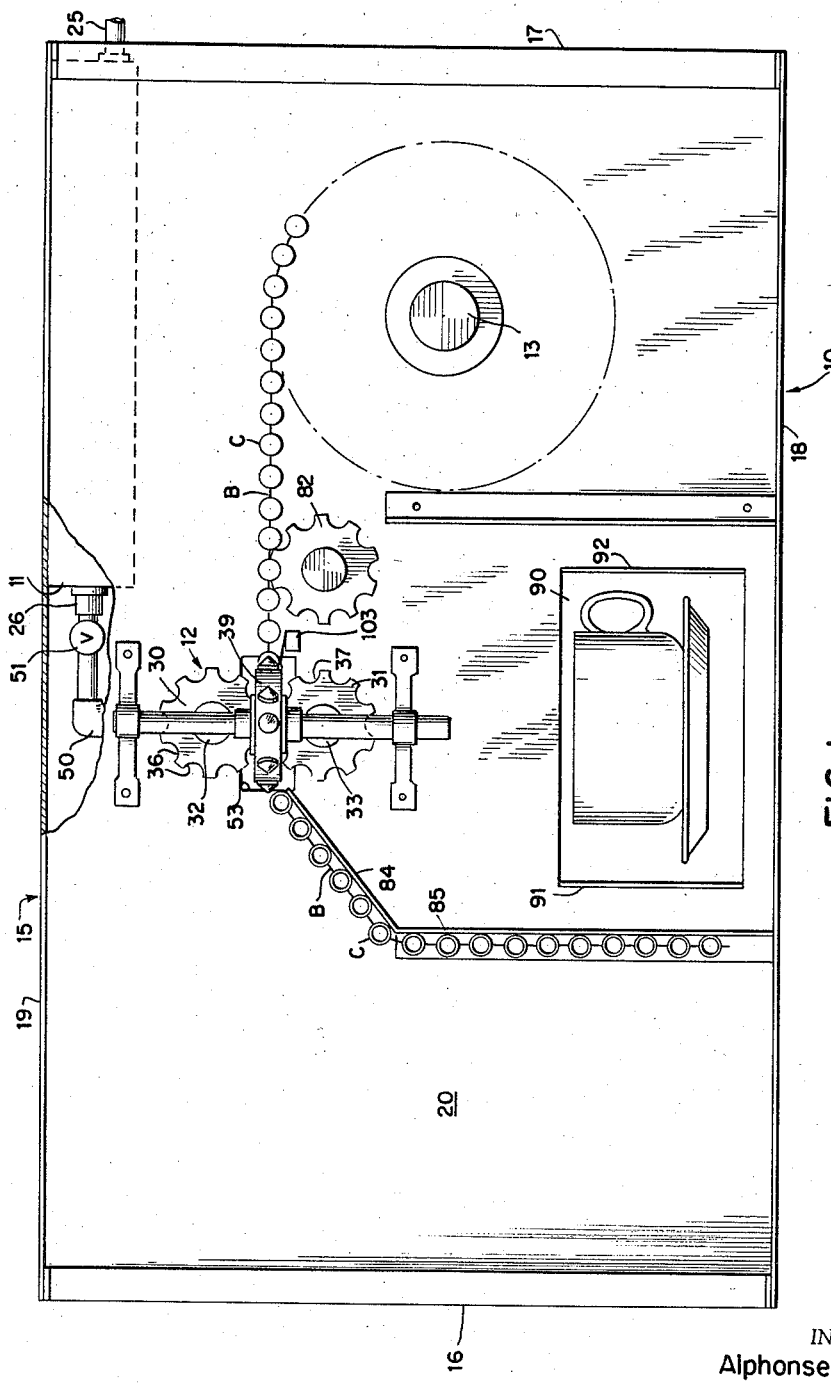
Figure 1 is an elevation of a coffee brewing machine constructed in accordance with my invention with the front cover panel of the device removed.

Referring to the drawings, generally the coffee brewing machine illustrated is designated by the reference numeral 10 and basically includes a hot water supply booster 11, a dispensing unit 12, a cartridge belt storage spindle 13, and a driving mechanism 14 housed within a cabinet 15.

More specifically, cabinet 15 is in the shape of a rectangular box including a pair of parallel end panels 16 and 17 affixed upright upon a floor panel 18 and over which is affixed a top panel 19. Panels 16, 17, 18 and 19 support centrally between them a vertical partition 20 on which most of the operating parts of coffee brewing machine 10 are mounted. The rear of the device is closed by a rear cover panel 21, and the front of the device is closed by a hinged front cover panel 22, which along its upper end is secured to the front edge of top cover panel 19 by hinge 23, permitting front cover panel 22 to be lifted away to expose dispensing unit 12. Centrally along its lower edge, front cover panel 22 is provided with a large rectangular aperture 24 providing access to the delivery end of dispensing unit 12.

Hot water supply booster 11 is affixed to the underside of top of cover panel 19 between rear panel 21 and partition 20 adjacent end panel 17. Booster 11 is provided with an inlet fitting 25 extending through end panel 17 for connection to a hot water main and is provided with a conventional electrical resistance heating element, which, when energized, permits booster 11 to deliver water at its boiling point through an outlet fitting 26.

Dispensing unit 12 is mounted on central partition 20 near the upper center of cabinet 15 adjacent outlet fitting 26 from booster 11 and substantially above the upper edge of rectangular aperture 24 in front cover panel 22. Dispensing unit 12 includes a pair of cartridge receiving barrels 30 and 31 of identical construction with barrel 30 disposed directly over barrel 31 with their cylindrical exterior surfaces tangent. Barrels 30 and 31 are mounted affixed to vertically aligned parallel axles 32 and 33, respectively, and are positioned immediately in front of central partition 20 with the rear ends of axles 32 and 33 extending through and journaled for rotation in suitable bearings mounted in panel 20. At the rear ends of axles 32 and 33 extended through panel 20, sprockets 34 and 35 are respectively affixed to axles 32 and 33.

The cylindrical exterior surfaces of barrels 30 and 31 are each provided with ten longitudinally extending grooves 36 and 37, respectively, each of which opens at both ends into the end surfaces of its associated barrel 30 or 31. Each of grooves 36 is disposed at equal arcuate intervals about barrel 30 and each of grooves 37 is similarly disposed at equal arcuate intervals about barrel 31. Each of grooves 36 and 37, moreover, has identical dimensions to those of the others and consists of a cylindrical surface cut into the exterior cylindrical surface of its associated barrel by a cylinder having its axis lengthwise on the cylindrical surface of the barrel. It will be thus evident that when barrels 30 and 31 are counter-rotated, grooves 36 and 37 are carried laterally through cylindrical paths having contiguous positions along the line of tangency of the exterior cylindrical surfaces of barrels 30 and 31. By proper synchronism of rotation of barrels 30 and 31, grooves 36 can thus be made to align with grooves 37 defining an open-ended cylindrical pocket as each associated pair of grooves 36 and 37 come into alignment.

Dispensing unit 12 further includes a pair of annular wheels 38 and 39. Wheel 38 is mounted on a vertical shaft 40 which is supported on the rear face of central partition 20 by means of a bracket 41 attached to the rear face of partition 20. Bracket 41 extends a short distance rearwardly from partition 20 where it is affixed to the lower end of shaft 40 supporting shaft 40 in upright position. The upper end of shaft 40 carries affixed to it a collar 42 having an integral, radial flange 43, the upper surface of which lies in substantially a horizontal plane and includes an annular ball bearing race 44 (see Figure 5). Centrally on its upper face flange 43 carries a fixed hub 45 which is coaxial with and spaced inwardly of bearing race 44. Wheel 38 is of annular shape and fits in sliding contact about hub 45 with its underside resting on ball bearings 46 which are positioned in bearing race 44. Wheel 38 is thus freely rotatable about hub 45.

Hub 45, which is hollow and is provided with a central aperture on its upper side, carries a fitting 47 secured on its upper side connecting the interior of hub 45 through the central aperture. Fitting 47 is at its upper end threadedly engaged with the lower end of a pipe 48 which is supported in fixed position by a bracket 49 attached to the rear face of partition 20. The upper end of pipe 48 leads through an elbow 50 to a valve 51 connected to outlet fitting 26 of hot water booster 11, thus communicating the hot water supply with the interior of hub 45. Hub 45 is also provided (see Figure 6) with a peripheral aperture 52 facing and aligned with the pocket formed between grooves 36 and 37 when any pair of the latter are in aligned position. A slot 53 is cut in partition 20 to register with the same pocket and opening 52, with dimensions permitting wheel 38, as it revolves about hub 45, to pass through slot 53 to a position closely adjacent the aligned position of grooves 36 and 37.

Wheel 38 is further provided with ten equally spaced radial bores 54 having essentially the same transverse dimensions as aperture 52 in hub 45. Each bore 54, as it rotates to a position aligned with aperture 52, has its inner end registering with aperture 52 and its outer end registering with the pocket between grooves 36 and 37, when any pair of the latter are in aligned position. Each bore 54 of wheel 38 receives a tight-fitting tube 55 which projects outwardly from the rim of wheel 38, such that its outer end just enters the open end of the pocket formed by a pair of confronting grooves 36 and 37 when the latter are in aligned position. The end of each tube 55 is further provided with a conical piercing point 56 having a number of perforations extending through its lower portion to permit passage of a liquid such as water through piercing point 56.

It will be thus evident that if barrels 30 and 31 are counter-rotated in synchronism, the free rotation of wheel 38 about a vertical axis permits a pair of grooves 36 and 37 approaching the aligned position to catch a conical piercing point 56 and carry this into a position entering a pocket formed by such grooves 36 and 37 as they confront each other in aligned position, and thereafter to carry the conical tip 56 away from such position. As the barrels continue to counter-rotate in such manner, wheel 38 will therefore rotate in synchronism with barrels 30 and 31. Moreover, it will be apparent that the fluid conduit connection provided by pipe 48, the interior of hub 45 and tubes 55, provides a communication with the interior of such pocket between a confronting pair of grooves 36 and 37 at the moment of alignment by registering the interior of tube 55 with aperture 52 in hub 45.

The forward end of dispensing unit 12 is similarly provided with a second wheel 39 mounted almost in identical manner. Thus annular wheel 39 is supported for rotation about a vertical axis on the forward face of partition 20 adjacent to the forward end of the open-ended pocket formed between the confronting grooves 36 and 37 in aligned position. More specifically, an open-ended delivery pipe 60, which is threadedly received at its upper end in a central aperture on the underside of a hollow hub 61, is supported in upright position near its lower end by a bracket 62 secured to the forward face of partition 20 and positioned at approximately the same horizontal level as bracket 41 (below barrel 31), however, leaving the lower, delivery end of pipe 60 open. Pipe 60, adjacent its upper end immediately beneath hub 61, carries affixed to it a collar 63, which at its upper end is provided with an integral, radially-extending flange 64. The upper face of flange 64 is affixed to the underside of hub 61 and extends outwardly from the perimeter of hub 61 where it is provided with an annular bearing race 65 which is coaxially positioned with respect to hub 61.

Wheel 39 is positioned for rotation about hub 61 in sliding contact with its perimeter and with the underside of wheel 39 freely supported on ball bearings 66 retained in ball bearing race 65. The assembly is further steadied by a fitting 67 secured to the upper side of hub 61 which is affixed to the lower end of upright pipe 68, the upper end of which is supported by a bracket 69 secured to the forward side of central partition 20 and positioned at approximately the same horizontal level as bracket 49, a position above barrel 30.

Hub 61, like hub 45, is provided with an aperture 70 in its perimeter aligned with the forward end of the open-ended pocket which is formed between a pair of confronting grooves 36 and 37 as the latter confront each other in their aligned position. Wheel 39, like wheel 38, is also provided with ten equally spaced radial bores 71, which have essentially the same transverse dimensions as aperture 70 and which, in sequence, register with aperture 70 as wheel 39 rotates about hub 61. Each bore 70 is provided with a tight-fitting tube 72, the outer end of which projects beyond the perimeter of wheel 39 such that as wheel 39 rotates in synchronism with barrels 30 and 31, the outer end of each tube 72 in sequence enters the forward end of the open-ended pocket formed between associated pairs of grooves 36 and 37 as these in sequence pass through a point of alignment at which they confront each other. The outer end of each tube 72 is further provided with a conical piercing point 73 which is provided with a number of perforations to permit the passage of liquid such as water through each piercing point 73.

Wheel 39 is rotated, like wheel 38, by having its various tips 73 caught in sequence between approaching grooves 36 and 37 as these converge in sequence to a confronting position in which they are aligned. Also, as in the case of wheel 38, when each tip 73 is brought into the end of the pocket formed by an aligned pair of grooves 36 and 37 the inner end of its associated tube 72 is brought into registry with aperture 70 of hub 61, thus completing a fluid communication between the pocket formed between a confronting pair of grooves 36 and 37 with delivery pipe 60, which terminates at its lower, delivery end in the space behind aperture 24 of front cover panel 22 of cabinet 15.

Driving mechanism 14 includes a motor 75 mounted on floor panel 18 between center partition 20 and rear panel 21 of cabinet 15 adjacent end panel 16. Motor 75 at its end facing partition 20 has its output shaft 76 connected to drive a sprocket 77 affixed to shaft 76. Driving mechanism 14 also includes a pair of sprocket wheels 78 and 79 rotatably mounted on the rear face of center partition 20 aligned with sprockets 34 and 35 and aligned with sprocket 77. Sprocket 78 is journaled to the left of sprockets 34 and 35 as seen from the rear (see Figure 3) and sprocket 79 is journaled to the right of sprockets 34 and 35 as shown from the rear. Both sprockets 78 and 79 rotate about horizontal axes lying at a common horizontal level and are essentially identical to sprockets 34 and 35 except that sprocket 79 has a double wheel. One half of sprocket 79 carries an endless link chain 80 passing about sprocket 77 on motor 75. The other half of sprocket 79 carries an endless link chain 81 passing over the top of sprocket 34 about sprocket 78 and over the top of sprocket 35. In this manner, rotation of motor 75 drives chain 80, which in turn drives barrels 30 and 31 counter-rotating to each other. Accordingly, motor 75 therefore also drives wheels 38 and 39 by reason of the meshing of piercing points 56 and 73 with grooves 36 and 37 as these pass through their aligned position.

Figure 7:
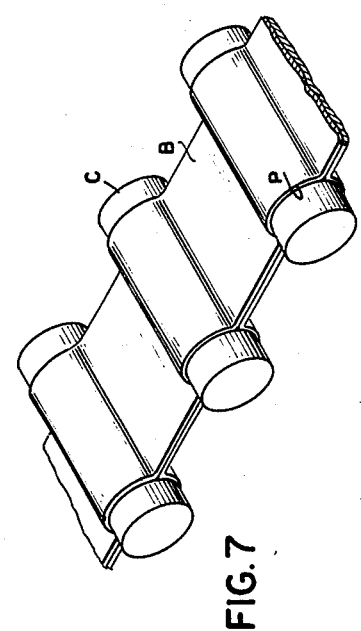
Figure 7 is a perspective view of a fragment of a cartridge feeding belt employed in the machine shown in Figures 1–6.

Referring more particularly to Figures 5 and 6, it will be observed that cooperating barrels 30 and 31 are designed to receive in the pocket between confronting grooves 36 and 37 a cylindrical cartridge C, constructed in the form of a conventional tin can, in which ordinarily the quantity of ground coffee required to brew a single serving is contained. Cartridges C in the arrangement shown in the drawings are linked together by a belt B (see Figure 7) along which are identically spaced pockets P for receiving cartridges C. The portion of belt B between pockets P is equal to the transverse arcuate dimension of the cylindrical surface of barrels 30 and 31 between adjacent grooves 36 and 37 respectively. Cartridges C, moreover, have dimensions such that they are tightly received between confronting grooves 36 and 37 as these pass through aligned position. The length of cartridges C is such that their ends are pierced (see Figure 6) by the entry of piercing tips 56 and 73 into the pocket formed between confronting grooves 36 and 37.

Figure 2:
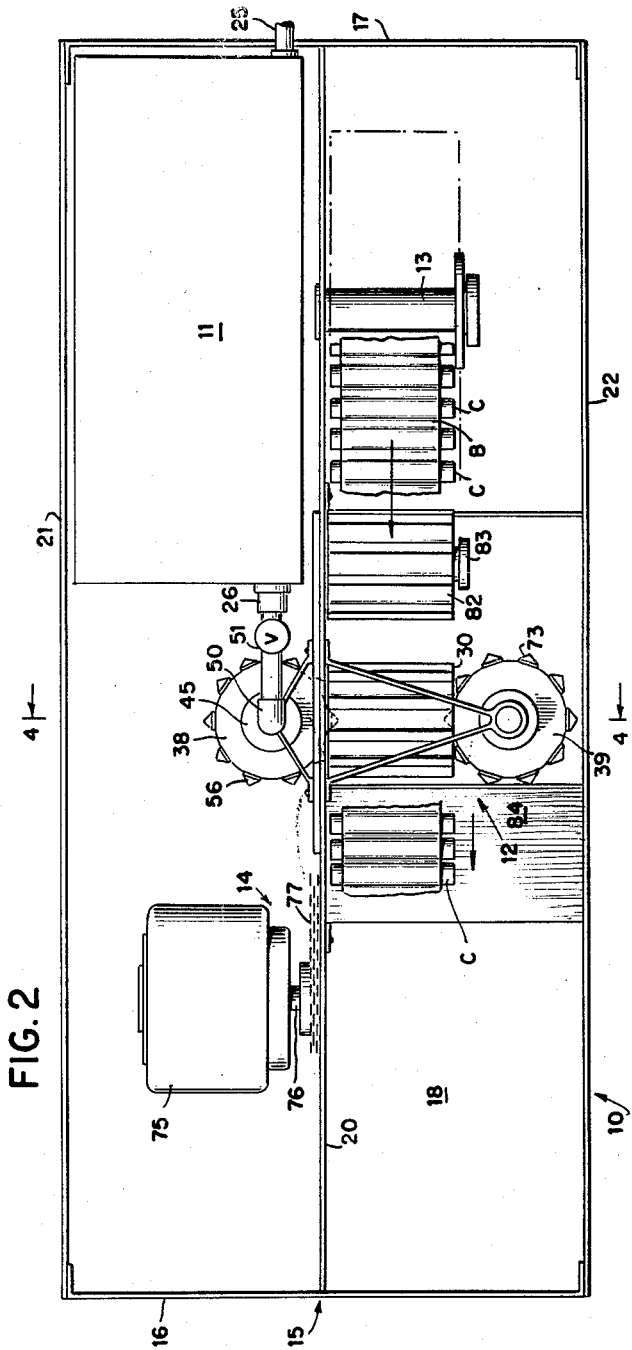
Figure 2 is a plan view of the machine shown in Figure 1 with the top removed.

In order to feed belt B loaded with cartridges C to cooperating barrels 30 and 31, spindle 13 (see Figures 1 and 2) is mounted on the forward face of center partition 20 for rotation about a horizontal axis parallel to the center line of the pocket formed between cooperating grooves 36 and 37 of barrels 30 and 31. Spindle 13 is designed to store a long belt B wrapped in spiral fashion about spindle 13. The outer end of belt B passes over an idler barrel 82, which is mounted for rotation on a spindle 83 affixed horizontally on the forward face of center partition 20 at the same horizontal level as barrel 31. Barrel 82 has the same exterior dimensions and grooving arrangement as barrels 30 and 31, such that it receives cartridges C as these pass from spindle 13 toward cooperating barrels 30 and 31.

Cartridge belt B containing punctured cartridges C is discarded into the forward portion of cabinet 15 behind front panel 22 adjacent end panel 16 of cabinet 15. To facilitate this, an inclined panel 84 is transversely positioned across the forward portion of the cabinet 15, having its higher edge adjacent the exit side (opposite idler 82) of cooperating barrels 30 and 31. Panel 84 is affixed at its rear edge to center partition 20 and is supported along its lower edge by a vertical panel 85 affixed to center partition 20 and floor panel 18, thus limiting the space in which the discarded cartridge belt B may fall to a position clear of aperture 24.

In order to provide proper operation, a control and actuating mechanism is required. As illustrative of this, a vertical trigger plate 90 is positioned in the lower center portion of cabinet 15 immediately behind aperture 24 in front cover panel 22. Plate 90 is aligned below and behind the lower end of delivery pipe 60 a distance such that a coffee cup and saucer positioned through aperture 24 to a position abutting plate 90 will place the cup directly beneath pipe 60. Desirably, the vertical edges of trigger plate 90 are provided with guide flanges 91 and 92 to limit lateral movement of a cup and saucer placed against plate 90 to a position keeping the cup beneath pipe 60.

Trigger plate 90 is supported on a crank 93 having a vertical position and a horizontal foot. The forward end of the horizontal foot on crank 93 extends rearwardly from the point at which it is affixed to plate 90 through an opening in center partition 20. The vertical portion of crank 93 rises upwardly behind partition 20 and is pivotly mounted, as indicated by the reference numeral 94, on a bracket attached to the rear face of center partition 20. Above pivoting point 94 a spring 95, positioned over a guide pin 96 affixed to the rear face of center partition 20, bears outwardly against the upper end of crank 93, holding plate 90 to a forward position.

The electrical circuit by which operation of valve 51 and motor 75 are controlled by trigger plate 90 is more clearly shown in Figure 8. In Figure 8 is will be evident that the control circuit includes, in addition to motor 75 and valve 51, a motor control relay 97, a timer 98 and a slow-acting relay 99 which are arranged to provide actuation of valve 51 immediately upon actuation of plate 90 for a limited period of time calculated to deliver one cupful of hot water from booster 11 through dispensing unit 12, and thereafter automatically to actuate motor 75 to rotate barrels 30 and 31 and wheels 38 and 39 each through one-tenth of a turn.

A normally open single-pole single-throw microswitch 100 (see also Figure 4) is mounted on a bracket 101 affixed to the rear face of center partition 20 with its actuating element 102 abutting the vertical straight portion of crank 93 below pivot point 94 such that movement of plate 90 rearwardly against the biasing of spring 95 will cause actuating element 102 to close switch 100. In addition a mercury switch 103 is mounted on the forward face of center partition 20 (see also Figure 4) to be tripped to closed position when a cartridge C is immediately adjacent barrels 30 and 31 ready to feed from idler 82 between a pair of grooves 36 and 37. Switches 100 and 103 are connected in series between power lines 104 and 105 in a circuit including a timer motor 106 of timer 98 and a normally open interlock switch 109 to provide energizing current for motor 106 immediately upon closure of switch 100 by rearward movement of trigger plate 90. Interlock switch 109 (see Figure 4) is a microswitch similar to microswitch 100 mounted on the underside of top cabinet panel 19 adjacent front panel 22, such that when front panel 22 is closed, switch 109 is also closed, but upon opening of panel 22, switch 109 opens.

Timer 98, in addition to its actuating motor 106, is provided with a pair of normally open contacts 106a, a pair of normally closed contacts 106b and a second pair of normally open contacts 106c which are actuated upon energizing of motor 106 for an accurately timed period and thereafter, are released. Timer 98 then re-sets itself for repetition of the timed actuation of its contacts upon re-energizing motor 106.

Contacts 106a are connected between timer motor 106 and power line 104 in parallel with switches 100 and 103 thus, assuming switch 103 is held closed by a cartridge C ready to feed between barrels 30 and 31, a momentary closure of switch 100 energizing motor 106 causes contacts 106a to close for the timed period providing a holding circuit for timer 106 which is released at the end of the timed interval. Contacts 106c are connected in series between power line 104 and a third power line 107 with a solenoid coil 51a, which is arranged to actuate valve 51 to the open position when coil 51a is energized by closure of the circuit through timer contacts 106c.

Relay 99 is a slow-acting relay including an actuating coil 108 and a pair of normally open contacts 108a, which, compared with the operation of the contacts associated with timer 98, close relatively slowly and open relatively slowly upon energizing and de-energizing of coil 108. Coil 108 is connected between power lines 104 and 105 through the parallel combination of switches 100 and 103 and of timer contacts 106a, thus the closure of contacts 100 followed by the setting up of the holding circuit through timer contacts 106a energizes relay 99 as well as timer 98 for the timed period. Since relay 99 is relatively slow-acting, however, contacts 108a close after actuation of the contacts associated with timer 98 and open after deactuation of such contacts.

Motor relay 97 includes an actuating coil 109 and four sets of associated, normally open contacts, 110a, 110b, 110c and 110d. Coil 110 on one side is connected to power line 105 through interlock switch 109 and on the other side is connected in series through normally closed timer contacts 106b and normally open relay contacts 108a to power line 107. It will be thus evident that coil 110 is energized once in every operating cycle after release of timer 98 which allows contacts 106b to return to their normally closed position before slow-acting relay contacts 108a are reopened.

Motor 75 is connected to power lines 104, 105 and 107 through contacts 110b, 110c and 110d, and suitable overload and fusing arrangements such that actuation of relay 97 starts motor 75. Motor 75, in addition to driving link belt 80, is provided with a rotor-actuated switch 111, which is normally closed but which is provided with ten equally angularly displaced open positions in one cycle of rotation of motor 75. This can be provided in any conventional manner, such as by arranging motor 75 to drive a cam operated microswitch which opens every 36° of rotation of the motor.

Rotor control switch 111 is connected in series with motor relay contacts 110a between power line 107 and the end of relay coil 110 connected to timer contacts 106b, thus paralleling the circuit through timer contacts 106b and slow-acting relay contacts 108a. The momentary energization of motor control relay 97 provided upon deactuation of timer 98 (which closes contacts 106b a moment prior to the release of contacts 108a) causes contacts 110a to close setting up a potential holding circuit for relay 97 through switch 111. Switch 111 thereupon also closes since motor 75 is simultaneously started by closure of the remaining relay contacts 110b, 110c and 110d. The delay in action of relay 99 therefore must be sufficient to permit actuation of motor relay 97 and movement of motor 75 a sufficient distance to carry switch 111 to a closed position. Motor 75 then continues to operate for one-tenth of a revolution. In the meantime, contacts 108a are released to their normally open position, such that as soon as switch 111 opents after completion of a tenth of a revolution of motor 75, relay 97 is released to stop motor 75.

To set up for operation cover panel 22 is raised, and barrels 30 and 31 are adjusted together with wheels 38 and 39 to a position in which a pair of grooves 36 and 37 confront each other, defining an open-ended pocket between barrels 30 and 31 in one end of which a piercing element 56 is positioned and into the other end of which a piercing element 73 is positioned. This position is shown, for example, in Figures 5 and 6. Link chain 81 is then positioned across sprockets 79, 34, 78 and 35 as described above. Motor 75 is then rotated to a position at which switch 111 is open and link chain 80 is installed between sprocket 79 and sprocket 77.

A cartridge belt B suitably loaded with closed cartridges C containing the proper amount of ground coffee to brew a single cup of coffee is then spirally wound upon spindle 13. The outer end of belt B is passed over idler 82 with cartridges C received in the grooves of idler 82. The free end of belt B leaving idler 82 is positioned closely adjacent the aligned grooves 36 and 37 of barrels 30 and 31. At such position mercury switch 103 is tripped by cartridge C to closed position.

The control circuit shown in Figure 8 is then energized by connecting power lines 104, 105 and 107 to an appropriate single phase, 230-volt A.-C. main, power line 105 being the ground wire. Trigger plate 90 is then pushed inwardly while the end cartridge C of belt B is still held in a position adjacent barrels 30 and 31 tripping switch 103 to closed position. Switch 100 is thus actuated. At the same time interlock switch 109 must be manually operated to close the circuit energizing timer motor 106 and relay coil 108. Since the hot water supply has not been connected, the actuation of valve 51 which occurs does not pass water through dispensing unit 12. When timer 98 times out, the closure of contacts 106b prior to the opening of contacts 108a, closes motor control relay 97. Motor 75 thereupon rotates a tenth of the rotation, causing the groove 36 above the end cartridge C and the groove 37 immediately below it to approach each other as barrels 30 and 31 counter-rotate, bringing such grooves into aligned position between wheels 38 and 39. As such grooves 36 and 37 close upon each other, they also mesh with the adjacent piercing elements 56 and 73 on wheels 38 and 39, causing wheels 38 and 39 to counter-rotate with barrels 30 and 31, bringing piercing elements 56 and 73 into opposite ends of the pocket formed between the approaching grooves 36 and 37. The insertion of elements 56 and 73 into the ends of such pocket breaks open the closed ends of cartridge C which has then been introduced into grooves 36 and 37 (see Figures 5 and 6). As motor 75 completes a tenth of a revolution, at which point grooves 36 and 37 are most closely adjacent to each other, switch 111 is again opened, disabling motor control relay 97, thereby disconnecting motor 75 from the power source. Interlock switch 109 can then be released.

Inlet fitting 25 is then connected to the hot water main, filling booster 11 with water. At the same time the electrical heating elements in booster 11 are connected to a suitable power source through a thermostatic control element mounted in booster 11 which assures that water in booster 11 will be kept just below 212° F. Front panel 22 is then lowered and secured, and the apparatus is ready for operation.

In operation the person desiring a cup of coffee takes the cup and places it into aperture 24 through front panel 22 against trigger plate 90, pushing trigger plate 90 backwardly to actuate element 102 and hence close switch 103. Closure of switch 100 connects timer motor 106 to the power supply, thereby actuating timer 98, which through contacts 106a establishes a holding circuit and which through contacts 106c energizes solenoid 51a which opens valve 51. The timing period of timer 98 is set such that valve 51 remains open, that is, timer 98 remains actuated, for a period calculated to deliver precisely one cupful of hot water through valve 51 from booster 11 to pipe 48 of dispensing unit 12.

The closure of switch 100 and subsequent closure of timer contacts 106a also energize coil 108, closing contacts 108a to establish a potential circuit between power lines 107 and 105 for energizing motor control relay 97. While timer 98 is actuated, the hot water delivered to pipe 48 passes downwardly through hollow hub 45 and the registering aperture 52 and tube 55. The water passes through the perforate half of piercing tip 56, infusing the coffee charge in cartridge C, which it leaves through the perforate piercing tip 73 of wheel 39 which acts as a filter to prevent removal of grounds. The brewed coffee passing through tip 73 exits through registering tube 71 and the hollow interior of hub 61 of wheel 39. Thence the extracted coffee is dropped through delivery pipe 60 into the waiting cup, which is held against trigger plate 90.

When timer 98 times out after releasing solenoid 51a and closing valve 51, the fast release of timer contacts 106b momentarily closes the energizing circuit for motor control relay 97 before contacts 108a open. Thus motor control relay coil 110 is energized and contacts 110a, 110b, 110c, and 110d close, starting motor 75 and establishing a potential holding circuit through contacts 110a and rotor-controlled switch 111 which is completed immediately upon movement of motor 75 prior to opening of contacts 108a. Suitable delay circuits can, of course, be provided in the actuating circuit for motor control relay 97 to delay this actuation after closure of valve 51 a sufficient period of time to permit proper drainage of coffee through dispensing pipe 60. When motor 75 is operated, a fresh cartridge C is then brought into position between the adjacent pair of grooves which approach aligned position. Simultaneously the used cartridge C is discarded. As the fresh cartridge C is properly positioned, switch 111 opens deactuating the control circuit.

It will be noted that the above described operation can be repeated until the last cartridge C is in place between barrels 30 and 31. Since at that point no cartridge C is in position to trip switch 103 the control circuit is disabled, preventing its further operation after the supply of cartridges C has been used up.

It will be evident that although I have described the employment of my invention with respect to a specific machine for brewing coffee my machine is generally applicable where it is desired to contact the contents of a closed container with a flowing liquid. It will be also evident that while I have described the employment of my machine with a cartridge belt-type feeding arrangement a simple 90° rotation of dispensing unit 12 will adapt it to a gravity feed of individual containers. All that is required is that a container be presented between the co-operating drums 30 and 31 as converging grooves 36 and 37 are carried to aligned position.

It will be also evident that many other variations in the general construction can be made. Instead of rotor-controlled indexing movement, Geneva movements can be employed. Instead of driving the piercing elements by the rotation of the cartridge receiving drums, the former can be separately driven in synchronism with the drums. Indeed drums 30 and 31 can be replaced by a variety of different cooperating members so long as these are arranged to bring a pair of cartridge receiving surfaces together simultaneously from the same direction. Similarly the piercing devices can be arranged to operate in a variety of ways so long as they move into operating position in synchronism with the rotation of the cartridge receiving devices.

I claim:

1. A device of the class described which includes a first movable cartridge receiving member having an exterior concave surface portion defining a first open-ended groove, a second cartridge receiving member having an exterior concave surface portion defining a second open-ended groove, means supporting said first receiving member for rotation about a first axis about which said first groove is rotatable laterally through a first path, means supporting said second receiving member for rotation about a second axis spaced from said first axis, about which second axis said second groove is laterally rotatable through a second path having a position aligned with a position along said first path and located between said first and second axes, means for counter-rotating said first and second receiving members in synchronism respectively about said first and second axes whereby said first and second groove from the same direction simultaneously approach said aligned position along said first and second paths with said first groove facing said second groove and with the opposite open ends of said first groove adjacent to the opposite open ends of said second groove to define an open-ended cartridge receiving pocket between said grooves at said aligned position, a first cartridge puncturing member including a first perforate piercing element and a first fluid conduit connected thereto, a second cartridge puncturing member including a second perforate piercing element and a second fluid conduit connected thereto, means supporting said first puncturing member for rotation about a third axis adjacent one end of said first and second receiving members at said aligned position, said first piercing element being rotatable about said third axis through a path including a puncturing position wherein said first piercing element is positioned adjacent one end of said open-ended pocket defined by said first and second receiving members in said aligned position, means supporting said second pericing member for rotation about a fourth axis adjacent the other end of said first and second receiving members at said aligned position, said second piercing element being rotatable about said fourth axis through a path including a puncturing position wherein said second piercing element is positioned in the other end of said open-ended pocket defined by said first and second receiving members at said aligned position, means for counter-rotating said first and second puncturing members in synchronism respectively about said third and fourth axes whereby said first and second puncturing elements simultaneously approach their respective puncturing positions from the same direction as said first and second receiving members approach their aligned position, and means for positioning a closed cartridge laterally adjacent said aligned position of said first and second receiving members to feed said cartridge therebetween and between said first and second puncturing members as said first and second grooves approach said aligned position and as said first and second piercing elements approach said puncturing positions whereby said cartridge is received in said pocket at said aligned position of said first and second receiving members and simultaneously is pierced at its ends by said first and second piercing elements and thereby the interior of said cartridge is placed in serial communication between said first and second fluid conduits.

2. A device according to claim 1 in which said first and second receiving members are a pair of cylindrical barrels and in which said first and second axes are parallel.

3. A device according to claim 1 in which said first and second cartridge puncturing members are a pair of wheels having said piercing elements mounted on the rims thereof and in which said third and fourth axes are parallel.

4. A device of the class described which includes a first barrel, means defining a plurality of open-ended cartridge receiving grooves disposed lengthwise along and spaced at arcuate intervals about said barrel, means supporting said first barrel for rotation about an axis such that said grooves are rotatable laterally through a common path, a second barrel, means defining a plurality of open-ended cartridge receiving grooves disposed lengthwise along and spaced at arcuate intervals about said second barrel, means supporting said second barrel for rotation about an axis such that said grooves thereon are rotatable laterally through a common path including a position aligned with a position on the common path of said grooves on said first barrel, means for counter-rotating said first and second barrels in synchronism whereby said grooves on said first and second barrels in pairs approach said aligned position with a groove on said first barrel facing a groove on said second barrel and with the opposite open ends thereof adjacent to define an open-ended cartridge receiving pocket between said pair of grooves at said aligned position, a first wheel including a plurality of perforate piercing elements mounted at arcuate intervals about the rim thereof and a first fluid conduit connected to communicate with said perforate piercing elements, means supporting said wheel for rotation at one end of said barrels about an axis such that said piercing elements are rotatable through a common path including a puncturing position in which said piercing elements in sequence are positioned adjacent one end of said open-ended pocket defined by a pair of grooves in said first and second barrels in said aligned position, a second wheel including a plurality of perforate piercing elements mounted at arcuate intervals about the rim thereof and a second fluid conduit connected to communicate with said perforate piercing elements, means supporting said second wheel for rotation at the other end of said barrels about an axis such that said piercing elements are rotatable through a common path including a puncturing position in which said piercing elements in sequence are positioned adjacent the other end of said open-ended pocket defined by a pair of grooves in said first and second barrels in said aligned position, means for counter-rotating said first and second wheels in synchronism whereby said puncturing elements in pairs simultaneously approach their respective puncturing positions from the same direction as said grooves on said first and second barrels approach their aligned position, and means for positioning a closed cartridge laterally adjacent said aligned position of said grooves on said first and second barrels to feed said cartridge therebetween and between said first and second wheels as a pair of said grooves approach said aligned position and as a pair of said piercing elements approach said puncturing positions whereby said cartridge is received in said pocket at said aligned position of said grooves and simultaneously is pierced at its ends by a pair of said piercing elements, and thereby the interior of said cartridge is placed in serial communication between said first and second fluid conduits.

5. A device according to claim 4 in which said barrels are identical and in which said grooves are positioned about said barrels at equal arcuate intervals.

6. A device according to claim 5 in which said wheels are identical, in which said piercing elements are positioned at equal arcuate intervals about said wheels.

7. A device according to claim 6 in which said piercing elements in said puncturing position enter the opposite ends of said open-ended pocket formed between said grooves in said aligned position whereby said means for rotating said wheels includes the open ends of said grooves and said piercing elements.

8. A device according to claim 4 which further includes means including a valve for connecting said first conduit to a hot water supply, control means positioned adjacent the end of said second conduit remote from said second wheel actuatable upon positioning of a receptacle at said end of said second conduit to open said valve for a limited period of time and thereafter to actuate said means for rotating said barrels and wheels to counter-rotate said barrels from a position in which one pair of grooves thereon are in said aligned position to a position in which an adjacent pair of grooves on said barrels are in said aligned position, and to counter-rotate said wheels from a position in which one pair of piercing elements are in said puncturing positions to a position in which an adjacent pair of piercing elements are in said puncturing positions, whereby hot water is passed through said first conduit through a cartridge initially positioned in said pocket and out through said second conduit into said receiver actuating said control means and thereafter said cartridge initially in said pocket is discarded and simultaneously a fresh cartridge is positioned in said pocket formed between said adjacent pair of grooves.

References Cited in the file of this patent

UNITED STATES PATENTS

| | | |
|---|---|---|
| 1,716,266 | Flamm | June 4, 1929 |
| 2,256,976 | Ford | Sept. 23, 1941 |
| 2,390,277 | Simpkins | Dec. 4, 1945 |
| 2,451,195 | Brown | Oct. 12, 1948 |
| 2,710,115 | Chandler | June 7, 1955 |
| 2,765,005 | Wellekens | Oct. 2, 1956 |
| 2,794,384 | Sierk et al. | June 4, 1957 |

FOREIGN PATENTS

| | | |
|---|---|---|
| 535,172 | Great Britain | Apr. 1, 1941 |